United States Patent
Faragher

(10) Patent No.: US 11,303,864 B2
(45) Date of Patent: Apr. 12, 2022

(54) SYSTEM AND METHOD FOR PROJECTOR ALIGNMENT USING DETECTED IMAGE FEATURES

(71) Applicant: CHRISTIE DIGITAL SYSTEMS USA, INC., Cypress, CA (US)

(72) Inventor: Chad Faragher, Kitchener (CA)

(73) Assignee: CHRISTIE DIGITAL SYSTEMS USA, INC., Cypress, CA (US)

(*) Notice: Subject to any disclaimer, the term of this patent is extended or adjusted under 35 U.S.C. 154(b) by 0 days.

(21) Appl. No.: 17/015,427

(22) Filed: Sep. 9, 2020

(65) Prior Publication Data

US 2022/0078382 A1 Mar. 10, 2022

(51) Int. Cl.
| | |
|---|---|
| G03B 21/14 | (2006.01) |
| H04N 9/31 | (2006.01) |
| G06T 7/80 | (2017.01) |
| G06V 10/44 | (2022.01) |
| G06V 10/46 | (2022.01) |

(52) U.S. Cl.
CPC ......... H04N 9/3185 (2013.01); G03B 21/147 (2013.01); G06T 7/80 (2017.01); G06V 10/44 (2022.01); G06V 10/462 (2022.01); H04N 9/3188 (2013.01)

(58) Field of Classification Search
CPC ...... H04N 9/31; H04N 9/3182; H04N 9/3194; H04N 9/3179; H04N 9/3158; G09G 2320/693; G09G 2320/0233
USPC .......................................................... 353/69
See application file for complete search history.

(56) References Cited

U.S. PATENT DOCUMENTS

| | | | |
|---|---|---|---|
| 7,477,762 B2* | 1/2009 | Zhang | G06T 7/80 |
| | | | 382/106 |
| 8,355,601 B2 | 1/2013 | Ding et al. | |
| 8,398,246 B2 | 3/2013 | Rutledge et al. | |
| 8,406,562 B2* | 3/2013 | Bassi | H04N 9/3194 |
| | | | 382/275 |
| 9,667,932 B2 | 5/2017 | Posa et al. | |
| 10,630,948 B2* | 4/2020 | Post | H04N 9/3182 |
| 2009/0115916 A1 | 5/2009 | Kondo et al. | |
| 2016/0196667 A1 | 7/2016 | Densham et al. | |

(Continued)

FOREIGN PATENT DOCUMENTS

| | | |
|---|---|---|
| CN | 102129680 A | 7/2011 |
| CN | 111083456 A | 4/2020 |
| JP | 2004165944 A | 6/2004 |

(Continued)

*Primary Examiner* — William C. Dowling
(74) *Attorney, Agent, or Firm* — Steven J Perry; Perry + Currier Inc.

(57) ABSTRACT

A method and apparatus are provided for calibrating projector alignment using detected image features projected onto a surface, the apparatus comprising a first processor detects features in a single frame of video and a second processor detects features in the corresponding projected image detected by a camera. The second processor matches features of interest in the selected video frame and captured image to correct the projector alignment. The images may be compared using blob detection or corner detection. Unlike prior art 'off-line' calibration methods, video frames can be processed continuously (e.g. every frame) or intermittently (e.g. every 10th frame) without interrupting the display of video content.

24 Claims, 3 Drawing Sheets

(56) References Cited

U.S. PATENT DOCUMENTS

2017/0308242 A1 10/2017 Vinas et al.
2018/0376116 A1* 12/2018 Grundhofer ....... G01B 11/2504

FOREIGN PATENT DOCUMENTS

JP     2017059903 A    3/2017
WO   WO-2018225531 A1   4/2020

* cited by examiner

SYSTEM AND METHOD FOR PROJECTOR ALIGNMENT USING DETECTED IMAGE FEATURES

FIELD

The present specification relates to methods of calibrating projectors to eliminate image distortions, and in particular to a real-time method and apparatus for calibrating projector alignment using detected image features projected onto a surface.

BACKGROUND

One challenge with operating projector systems is maintaining calibration (e.g. geometrical alignment (keystone correction), brightness equalization, etc.) between the source image (e.g. video stream) and the image as displayed on the screen. Manual calibration is often time consuming and requires that the projection system be 'off-line' while calibration is being performed. To at least partially address this challenge, camera-based projector alignment systems have been designed for automatically calibrating projection systems more quickly and accurately than is possible with manual calibration. Although such camera-based projector alignment systems result in faster calibration than is possible with manual adjustment, the projection system must nonetheless continue to be taken off-line in order to project the calibration patterns required to perform the automatic calibration. During this time, the video content cannot be displayed, and instead, calibration patterns are displayed by the projector (structured light). The geometry of the patterns can be measured by a camera that takes a picture of the projected imagery. For example, the exact camera-image-sensor coordinates of a test pattern such as a white square on a black background can be easily found via blob-detection, which is a method used in computer vision for detecting regions in a digital image that differ in properties, such as brightness or color, compared to surrounding regions. By knowing the coordinates of each blob in both camera coordinates and projector coordinates, a mapping between the two spaces can be determined to arrive at a calibration.

In addition to the disadvantages of requiring the projection system to operate off-line during calibration, it is also difficult to automatically determine when a system needs to be realigned without taking the system off-line.

The following is known from the prior art: U.S. Pat. No. 9,667,932B2—Automatic correction of keystone distortion and other unwanted artifacts in projected images; US2016196667A1—System and method for tracking; JP2017059903A—Projection system, projection device, information processing device and program; WO2018225531A1—Image processing device and method; U.S. Pat. No. 8,355,601B2—Real-time geometry aware projection and fast re-calibration; US20170308242A1—Projection alignment; U.S. Pat. No. 8,398,246B2—Real-time projection management.

SUMMARY

It is an aspect of the present specification to provide a method and apparatus for generating a stream of camera-projector correspondence points, the primary application of which is camera-based projector image alignment and continuous healing. The method operates in real-time to detect image features in incoming video 'on the fly' as it is projected. The incoming video can therefore be used as an alignment pattern that is detected by a camera to find features in the projected image that match identical features in the incoming video for calibrating the projector alignment. Operation of the camera and projector are synchronized to ensure that the camera takes a picture of the appropriate frame of video containing the image features to be located in the captured camera image.

In one embodiment, a first processor detects features in a single frame of the video input and a second processor detects features in the corresponding projected image detected by the camera. The second processor matches features of interest in the selected video frame and captured image and this information can be used to correct the projector alignment. The images may be compared using blob detection or corner detection. Unlike prior art 'off-line' calibration methods, video frames can be processed continuously (e.g. every frame) or intermittently (e.g. every $10^{th}$ frame) without interrupting the display of video content.

The above aspect can be attained by a system for calibrating alignment of video images from an image generator projected on a display surface, comprising a video feature detector for locating and generating a list of video features of interest in a frame of video output from the image generator; an image detection device for capturing an image of the frame of video projected on the display surface; an image feature detector for locating and generating a list of projected image features of interest in the projected frame; and a calibration controller for receiving and matching the same features from the list of video features and list of projected image features of interest, and in response generating geometry correction signals to facilitate alignment of the projected video images.

According to another aspect, there is provided a method of calibrating alignment of video images from an image generator projected on a display surface, comprising locating features of interest in a frame of video output from the image generator; capturing an image of the frame of video projected on the display surface; receiving coordinates of the features of interest in the frame of video output from the image generator; locating the same features of interest in the captured image of the frame of video projected on the display surface; and matching coordinates of the features of interest in the frame of video output from the image generator and the same features of interest in the captured image of the frame of video projected on the display surface and transmitting said coordinates to facilitate alignment of projected video images.

In yet another aspect, there is provided a projection system, comprising an image generator for generating frames of video; a projector for projecting said frames of video as images on a display surface; a video feature detector for locating features of interest in a selected frame of video output from the image generator; an image detection device for capturing an image of the selected frame of video projected on the display surface; an image feature detector for locating and generating a list of projected image features of interest in the projected frame; and a calibration controller for receiving and matching the same features from the list of video features and list of projected image features of interest, and in response generating geometry correction signals to facilitate alignment of the projected video images.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION

Figure 1:
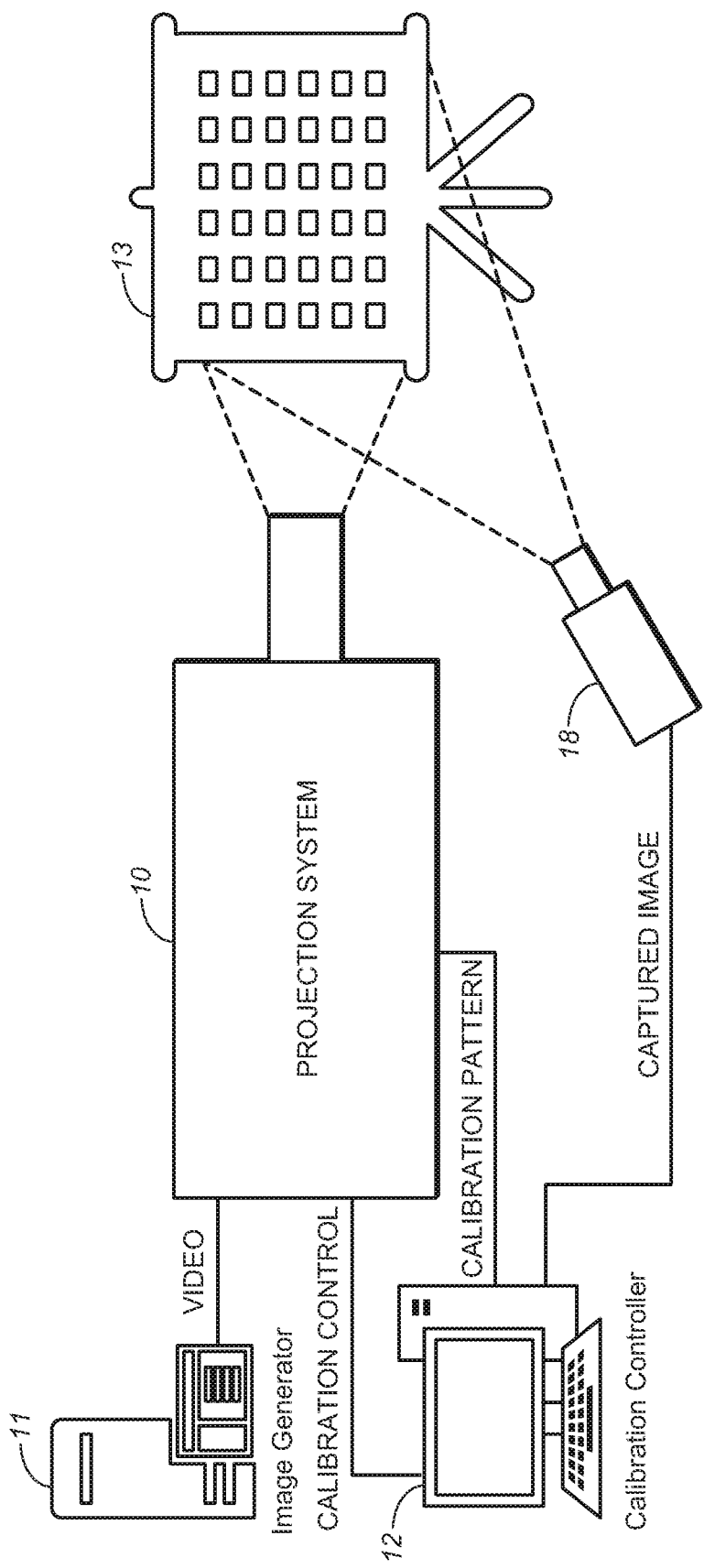
FIG. 1 shows an example of a camera-based projector alignment system, according to the prior art.

FIG. 1 shows an example of a camera-based projector alignment system, according to the prior art. The system includes a projection system 10 for projecting visible images from an image generator 11 and calibration patterns from a calibration controller 12 on a display 13. Although the calibration controller 12 is illustrated as being a separate component external to the projection system 10, all or portions of the calibration controller 12 may be incorporated into the projection system 10 or image generator 11.

The calibration controller 12 triggers generation of at least one calibration pattern (either via the controller 12, the image generator 11 or the projection system 10), for projection onto the display 13. The calibration pattern can be detected, for example, using off-the-shelf camera equipment. For example, a standard CCD-based camera 18 can be used.

Detected calibration patterns may be transmitted back to the calibration controller 12 for performing calibration and/or re-calibration of the projection system 10 using known techniques. For example, the exact camera-image-sensor coordinates of a test pattern such as a white square on a black background can be easily found via blob-detection. By knowing the coordinates of each blob in both camera coordinates and projector coordinates, a mapping can be determined to arrive at a calibration. For example, warp-capable projection systems such as the Matrix™ series of projectors from Christie Digital Systems Canada, Inc. can perform calibration through geometry correction and edge blending algorithms. Alternatively, calibration can be performed through image correction at the image generator 11.

As discussed above, during calibration using the system of FIG. 1, video content cannot be displayed, and instead, technical block patterns (structured light) are displayed by the projection system 10.

Figure 2:
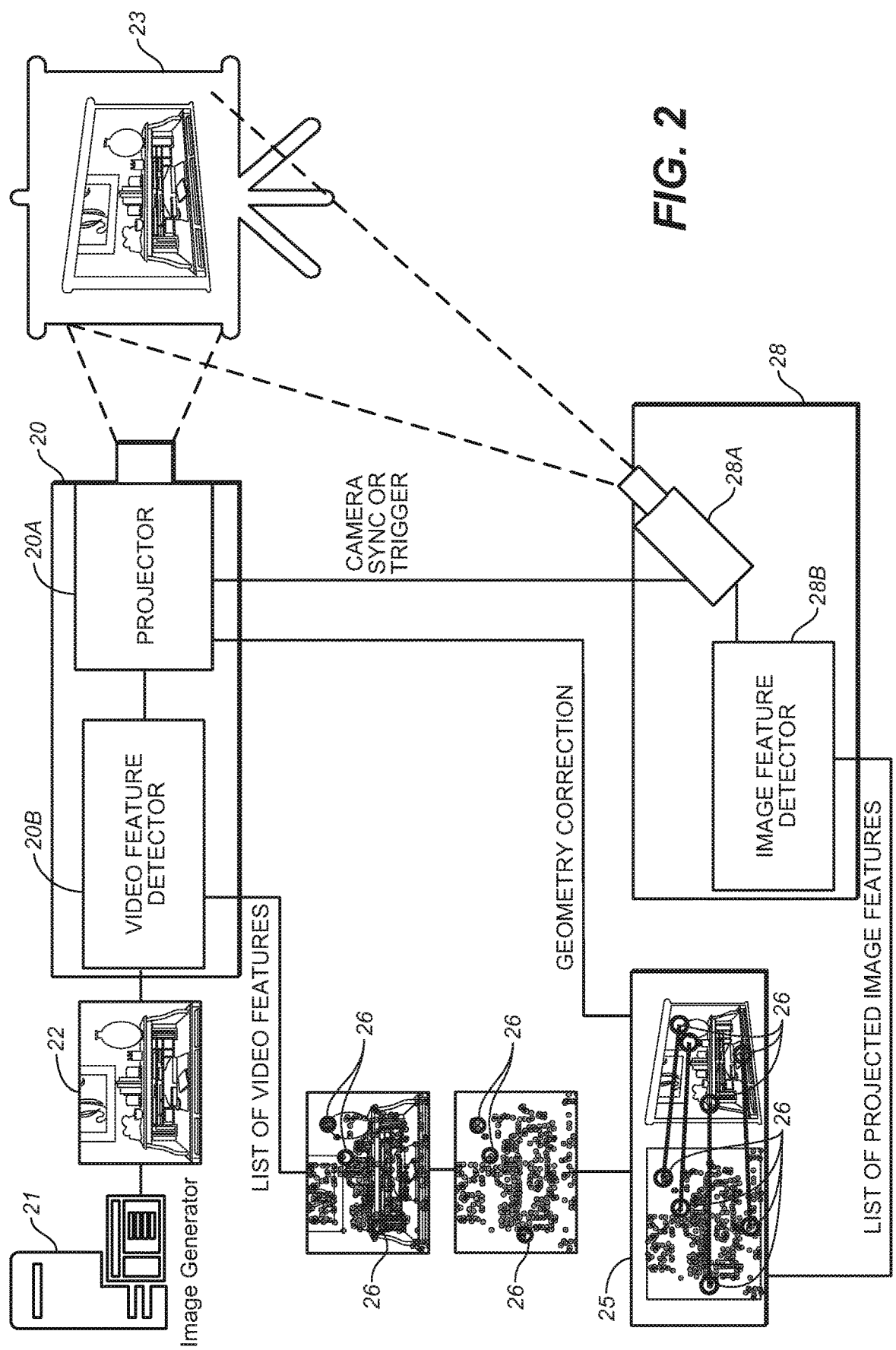
FIG. 2 is a block diagram showing details of a system for real-time projector alignment calibration, according to an embodiment.
Figure 3:
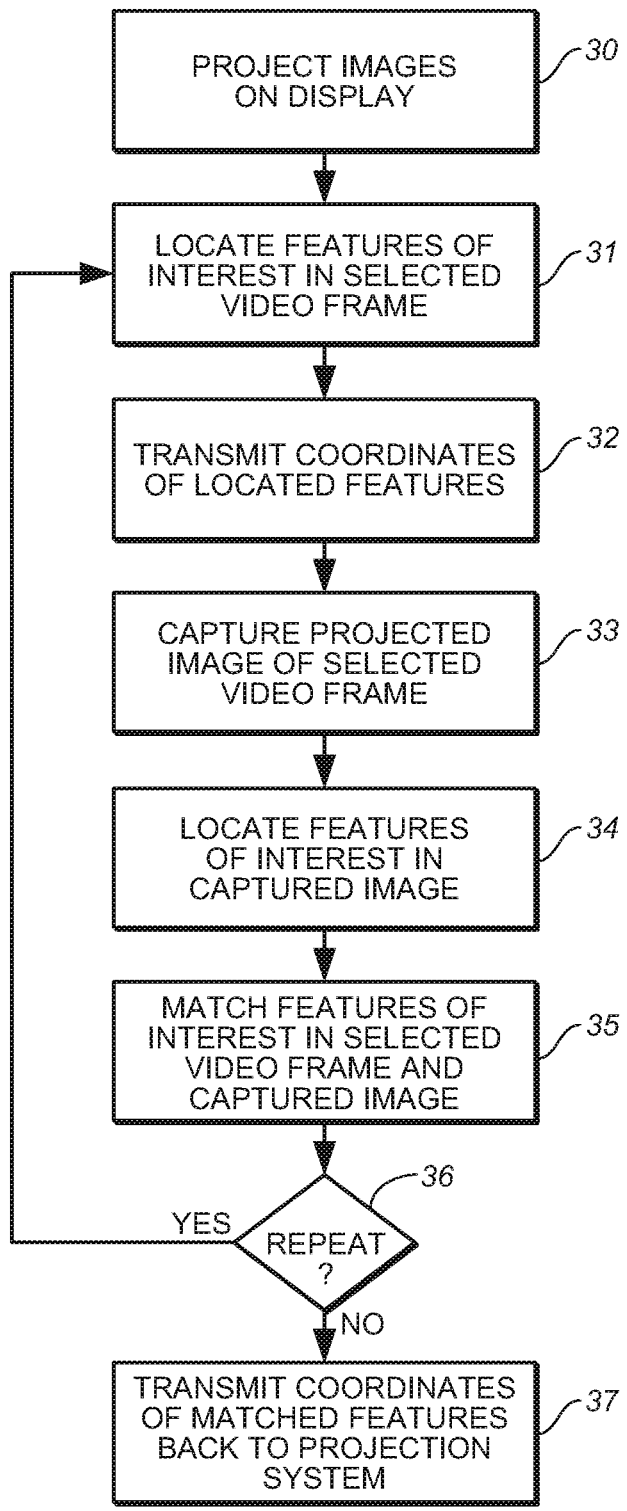
FIG. 3 is a flowchart showing a method of operating the system of FIG. 2, according to an embodiment.

A system for real-time projector alignment calibration is shown in FIG. 2, operating in accordance with a method shown in FIG. 3, according to aspects of the invention.

The system for real-time projector alignment calibration includes a projection system 20 having a projector 20A, for projecting visible images from a decoded video input stream 22 (e.g. full-motion video) output from image generator 21, on to a display surface 23, such as a screen. An image detection system 28, having an image detection device 28A detects visible images of the projected video on the display surface 23, As in the prior art system of FIG. 1, image detection device 28A can be a standard CCD-based camera that is pointed at the display surface 23.

A video feature detector 20B of projection system 20 receives the decoded unencrypted video input stream 22 and generates a list of video features, as discussed in greater detail below. A projected image feature detector 28B receives the images from image detection device 28A and generates a list of projected image features, as discussed in greater detail below. A calibration controller 25 generates geometry correction signals to the projector 20A in response to receiving the lists of video and projected image features. Calibration controller 25 can be a small external computing device capable of image processing (e.g. similar to hardware in a Christie Mystique® projection system, or an NVIDIA Jetson Nano® or full PC with GPU.)

Although detectors 20A and 28A are illustrated as being incorporated into the projection system 20A and image detection system 28, respectively (e.g. using FPGA circuitry), it is contemplated that the detectors can be separate components external to the projection system 20 and image detection system 28 In the preferred embodiment, detectors 20A and 28A are incorporated into the projection system 20A and image detection system 28, respectively, so that video features can be detected and processed without transmitting the uncompressed and unencrypted video to any external component, and so that the image processing of projected image features is performed close to the image detection device 28A.

Thus, video feature detector 20B detects the video features and preferably only transmits a list of the features to the calibration controller 25 (for example, a list of x,y coordinates of "corners" found in the image and their orientation), rather than entire images. This maintains copy-protection restriction by not transmitting unencrypted video outside of the video image pipeline. Similarly, according to the preferred embodiment, a list of projected image features are sent to the calibration controller 25, which requires less bandwidth than transmitting the entire unprocessed image to the calibration controller 25. Wth reference to FIG. 3, in conjunction with the system of FIG. 2, at step 30, projection system 20 projects visible images from the decoded video input stream 22 on to the display surface 23.

At step 31, video feature detector 20B, which is in the video input path and has access to the digital images from image generator 21, locates features of interest 26 in a selected video frame from the decoded video stream. For example, video feature detector 20B can use image processing algorithms (such as SIFT, SURF, Harris corner detection, etc.) to automatically locate and characterize visual features 26 from the selected video frame. The features 26 have a precise position, in terms of (x,y) coordinates, within the image, as well as other image quantities (e.g. size of a blob, eccentricity, orientation, etc.) that help to distinguish features 26 from other features in the image, thereby facilitating matching of features 26 against similar image features in the image that is captured by image detection device 28, for determining projector-camera correspondence points, as discussed below.

At step 32, video feature detector 20B transmits the list of video features (i.e. coordinates) 27 of the located features 26 (rather than pixels of the video image content) to calibration controller 25, which can be part of the projection system 20 or can be located "upstream" and separate from the projection system.

At step 33, image detection device 28A captures the image displayed on display surface 23. The image detection device 28A can, for example, be triggered by a signal from the projection system 20 so as to be synchronized to the selected video frame processed by video feature detector 20B, with no crosstalk between previous or subsequent video frames, so as to contain a clean image of only the selected frame of video of interest.

At step 34, calibration controller 25 uses the same feature detection algorithm used by video feature detector 20B to locate the features of interest 26 in the list of image features detected by image feature detector 28B (i.e. the same features located by video feature detector 20B). Because the same algorithm is applied, the same features will be detected and characterized the same way as the features detected by video feature detector 20B directly from the video input stream 22.

Then, at step 35, calibration controller 25 matches the features 26 between selected video frame from video input stream 22 and the same features 26 in the image captured by image detection device 28 to determine correspondences expressed in terms of corresponding projector coordinates $X_{proj}$ and camera coordinates $X_{camera}$. An exemplary feature matching algorithm for this purpose is OpenCV Feature Matching available on-line in the Open Source Computer Vision Library.

Finally, at step 37, geometry correction signals are transmitted to projector 20A (or alternatively to image generator 21) for calibration control using known techniques. For example, warp-capable projection systems such as the Matrix™ series of projectors from Christie Digital Systems Canada, Inc. can perform calibration through geometry correction and edge blending algorithms. Alternatively, calibration can be performed through image correction at the image generator 21. If, when projecting the visible images from the decoded video input stream 22, the projection system 20 is applying image warping, the projection system 20 can communicate the altered (warped) coordinates of the image from video feature detector 20B to calibration controller 25 to account for any warping that the projection system 20 is performing to the image signal before it is transmitted to the internal digital micromirror (DMD) of the projection system 20.

According to the description above, the projection system 20 (or alternatively the image generator 21) can make use of the camera-projector correspondences produced by the method of FIG. 3 and the system of FIG. 2 to perform digital image warping to place the image in the desired position the display surface 23.

As discussed above, the calibration method of FIG. 3 is performed during normal processing of a single frame of video, without any interruption in the normal display of video. It is further contemplated that the process set forth in FIG. 3 may be repeated (i.e. a YES at step 36) for generation of continued image feature correspondences (e.g. every 10$^{th}$ video frame), or as often as is necessary for a continuous healing process, or as rate limited by other factors such as the rate at which new warps can be sent to the projection system 20 (which may not be real-time).

It should be noted that in the event there are no detectable features in the input video stream 22 (e.g. images of clear blue sky, or solid colours, etc.) continuous healing can be delayed until the video stream includes detectable features 26.

Care should also be taken when positioning the image detection device 28 to ensure features between the incoming video stream and the camera images can be matched (e.g. setups that will confound the feature matching mechanism should be avoided, such as locating the camera too far away from display surface 23, or introducing visual distractions in the field of view of the camera).

While particular embodiments have been illustrated and described, it will be apparent to those skilled in the art that various changes and modifications can be made and are intended to fall within the scope of the present disclosure. Furthermore, although the present disclosure has been described herein in the context of particular implementations in particular environments for particular purposes, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A system for calibrating alignment of video images from an image generator projected on a display surface, comprising:
   a video feature detector for locating and generating a list of video features of interest in a frame of video output from the image generator;
   an image detection device for capturing an image of the frame of video projected on the display surface;
   an image feature detector for locating and generating a list of projected image features of interest in the projected frame; and
   a calibration controller for receiving and matching the same features from the list of video features and list of projected image features of interest, and in response generating geometry correction signals to facilitate alignment of the projected video images.

2. The system of claim 1, wherein the lists of video features and projected image features is a list of (x,y) coordinates of the features of interest.

3. The system of claim 1, wherein the image detection device comprises a camera.

4. The system of claim 3, wherein the camera is triggered by a signal from the projection system so as to be synchronized to the frame of video output from the image generator.

5. The system of claim 1, wherein the video feature detector executes an image processing algorithm for locating the features of interest in the frame of video output from the image generator.

6. The system of claim 5, wherein the image processing algorithm comprises one of either SIFT, SURF or Harris corner detection.

7. The system of claim 5, wherein the image feature detector executes said image processing algorithm for locating the same features of interest in the image captured by the image detection device.

8. The system of claim 5, wherein the calibration controller executes a feature matching algorithm for matching coordinates of the features of interest generated by the image feature detector and the same features of interest generated by the image feature detector.

9. A method of calibrating alignment of video images from an image generator projected on a display surface, comprising:
   i) locating features of interest in a frame of video output from the image generator;
   ii) capturing an image of the frame of video projected on the display surface;
   iii) receiving coordinates of the features of interest in the frame of video output from the image generator;
   iv) locating the same features of interest in the captured image of the frame of video projected on the display surface; and
   v) matching coordinates of the features of interest in the frame of video output from the image generator and the same features of interest in the captured image of the frame of video projected on the display surface and transmitting said coordinates to facilitate alignment of projected video images.

10. The method of claim 9, wherein i) to v) are repeated for real-time continuous healing.

11. The method of claim 10, wherein i) to v) are repeated once per number of video frames.

12. The method of claim 10, wherein i) to v) are repeated at a rate at which warps are generated.

13. The method of claim 9, wherein locating the features of interest in the frame of video output from the image generator comprises automatically locating and characterizing visual features using an image processing algorithm.

14. The method of claim 13, wherein the image processing algorithm comprises one of either SIFT, SURF or Harris corner detection.

15. The method of claim 13, wherein locating the same features of interest in the captured image of the frame of video projected on the display surface comprises automatically locating and characterizing visual features using said image processing algorithm.

16. The method of claim 9, wherein said matching coordinates comprises determining correspondences using a feature matching algorithm.

17. A projection system, comprising:
   an image generator for generating frames of video;
   a projector for projecting said frames of video as images on a display surface;
   a video feature detector for locating features of interest in a selected frame of video output from the image generator;
   an image detection device for capturing an image of the selected frame of video projected on the display surface;
   an image feature detector for locating and generating a list of projected image features of interest in the projected frame; and
   a calibration controller for receiving and matching the same features from the list of video features and list of projected image features of interest, and in response generating geometry correction signals to facilitate alignment of the projected video images.

18. The projection system of claim 17, wherein the lists of video and projected image features of interest is a list of (x,y) coordinates of the features of interest.

19. The projection system of claim 17, wherein the image detection device comprises a camera.

20. The projection system of claim 19, wherein the camera triggered by a signal from the projector so as to be synchronized to the selected frame of video output from the image generator.

21. The projection system of claim 17, wherein the video feature detector executes an image processing algorithm for locating the features of interest in the selected frame of video output from the image generator.

22. The projection system of claim 21, wherein the image processing algorithm comprises one of either SIFT, SURF or Harris corner detection.

23. The projection system of claim 21, wherein the image feature detector executes said image processing algorithm for locating the same features of interest in the image captured by the image detection device.

24. The projection system of claim 21, wherein the calibration controller executes a feature matching algorithm for matching coordinates of the features of interest generated by the image feature detector and the same features of interest generated by the image feature detector.

* * * * *